United States Patent
Liang (10) Patent No.: US 12,365,378 B2
(45) Date of Patent: Jul. 22, 2025

(54) FOLDABLE CART

(71) Applicant: Xiaojun Liang, Taizhou (CN)

(72) Inventor: Xiaojun Liang, Taizhou (CN)

( * ) Notice: Subject to any disclaimer, the term of this patent is extended or adjusted under 35 U.S.C. 154(b) by 0 days.

(21) Appl. No.: 18/976,812

(22) Filed: Dec. 11, 2024

(65) Prior Publication Data

US 2025/0108847 A1 Apr. 3, 2025

(30) Foreign Application Priority Data

Nov. 8, 2024 (CN) .......................... 202422742276.9

(51) Int. Cl.
*B62B 3/02* (2006.01)
*B62B 3/00* (2006.01)

(52) U.S. Cl.
CPC ................ *B62B 3/02* (2013.01); *B62B 3/004* (2013.01)

(58) Field of Classification Search
CPC .................................. B62B 3/02; B62B 3/004
See application file for complete search history.

(56) References Cited

U.S. PATENT DOCUMENTS

| | | | |
|---|---|---|---|
| 2,934,389 A * | 4/1960 | Krey | |
| 3,854,544 A * | 12/1974 | Kolchev | |
| 4,775,069 A * | 10/1988 | Stonier | |
| 7,255,239 B2 * | 8/2007 | Liu | |
| 8,495,961 B2 * | 7/2013 | Kiolbasa | |
| 9,694,837 B2 * | 7/2017 | Ryan | |
| 10,427,791 B2 * | 10/2019 | Beets | |
| 2024/0285069 A1 * | 8/2024 | Nicholson | |

* cited by examiner

*Primary Examiner* — James A Shriver, II
*Assistant Examiner* — Nicholas R. Kandas
(74) *Attorney, Agent, or Firm* — Daniel M. Cohn; Howard M. Cohn (57) ABSTRACT

A foldable cart comprises a cart body, wherein the cart body comprises a middle frame, end plates, a folding side plate, a cover plate and a bottom plate, castors are arranged at the bottoms of the middle frame and the end plate, and the folding side plate is connected to two sides of the middle frame through the end plate. The folding side plate greatly reduces the occupied space; a buckle and a clamping slot ensure the stability of the folded cart body; the bottom plate is locked through a positioning buckle after being turned over; a middle frame carrier rod is removably installed on the top of the middle frame through a button buckle; a metal strengthening rod ensures the structural strength of the middle frame carrier rod, supports the middle frame more stably, and ensures the overall structural strength of the cart body.

8 Claims, 11 Drawing Sheets

FOLDABLE CART

TECHNICAL FIELD

The utility model relates to the technical field of camping carts, in particular to a foldable cart.

BACKGROUND ART

Camping cart, as the name suggests, is a portable cart designed for camping. It is usually made of high-strength materials, strong and durable, and can easily cope with a variety of complex terrains. However, the existing camping carts still have the following deficiencies during use:

most of the existing camping carts are folded in an assembly type, some parts need to be stored separately after the whole carts are folded, the carts cannot be folded into a whole to result in inconvenient use, the internal space layout is fixed, and the carts cannot be adjusted on demand, so that the use effect is not satisfactory.

SUMMARY OF THE UTILITY MODEL

In order to realize the above purposes, the utility model provides the following technical proposal: a foldable cart comprises a cart body, wherein the cart body comprises a middle frame, end plates, a folding side plate, a cover plate and a bottom plate, castors are arranged at the bottoms of the middle frame and the end plate, and the folding side plate is connected to two sides of the middle frame through the end plate, the cover plate is arranged on the tops of the middle frame, the end plate and the folding side plate, the bottom plate is arranged at the bottoms of the middle frame, the end plate and the folding side plate, a middle frame carrier rod is removably connected to the top of the middle frame, and a metal strengthening rod is arranged inside the middle frame carrier rod.

Storage slots A are arranged inside one of the end plates and inside the middle frame for storing the bottom plate after being turned over, and at least two guide rails respectively located on both sides of the middle frame carrier rod are also arranged inside the middle frame for storing the removed cover plate.

The folding side plate comprises a side plate A and a side plate B, and the opposite ends of the side plate A and the side plate B are hinged with each other, and the reverse ends of the side plate A and the side plate B are hinged with the end plate and the middle frame respectively.

As a specific technical proposal of the embodiment, button buckles are arranged at both ends of the middle frame carrier rod, the middle frame carrier rod is movably clamped with the top of the middle frame through the button buckles, and one end of the button buckle extends to the top of the middle frame carrier rod.

As a preferred technical proposal of the utility model, a positioning buckle is arranged inside the storage slot A for seizing the bottom plate after being turned over.

As a preferred technical proposal of the utility model, a cover plate frame is arranged outside the cover plate, and support rods for supporting the cover plate are arranged on the side plate A, the side plate B, the middle frame carrier rod and the end plate.

As a preferred technical proposal of the utility model, a storage slot B and a cup holder located inside the storage slot B are arranged on one side of one of the end plates, and a cup tray is movably arranged inside the cup holder.

As a preferred technical proposal of the utility model, a storage slot C located on both sides of the storage slot B is arranged on one side of the end plate, a storage box is movably arranged inside the storage slot C, and a latch A inserted into the top of the inner wall of the storage slot C is movably arranged at the top of the storage box.

As a preferred technical proposal of the utility model, an access window is hinged inside the side plate A, a latch B is arranged inside one end of the access window away from the hinged end, one end of the latch B is inserted into the side plate A, and a handle slot is also arranged on one side of the side plate A.

As a preferred technical proposal of the utility model, a pull rod component is arranged inside the storage slot B and comprises a pull rod storage cylinder with a bottom end hinged inside the storage slot B, a pull rod body is movably arranged inside the pull rod storage cylinder, the top of the pull rod body extends to the outside of the pull rod storage cylinder and is provided with a pull rod handle, a latch C is also arranged inside the pull rod storage cylinder, and one end of the latch C is inserted into the inner wall of the storage slot B.

As a preferred technical proposal of the utility model, buckles are hinged on both sides of the middle frame and both sides of one end plate, and clamping slots are arranged on both sides of the other end plate and both sides of the middle frame.

As a preferred technical proposal of the utility model, a plurality of crisscrossed reinforcing ribs are arranged at the bottom of the bottom plate and on one side of the side plate A and the side plate B, buckle plates with one end extending to the bottom of the side plate A are arranged at the bottoms of the side plate A and the side plate B, and a clamping block with one end inserted into the buckle plate is arranged at the bottom of the bottom plate.

Compared with the prior art, the utility model provides a foldable cart, which has the following beneficial effects:

the folding side plate greatly reduces the occupied space after the whole cart body is folded; a buckle and a clamping slot ensure the stability of the folded cart body; the bottom plate is locked through a positioning buckle after being turned over, which is conducive to the subsequent folding operation; a middle frame carrier rod is removably installed on the top of the middle frame through a button buckle and ensures that the internal space of the cart body is not separated to allow larger items to be placed when being removed; a metal strengthening rod ensures the structural strength of the middle frame carrier rod, supports the middle frame more stably, and ensures the overall structural strength of the cart body.

Reference signs: 1. Cart body; 11. Middle frame; 111. Middle frame carrier rod; 112. Guide rail; 113. Metal strengthening rod; 114. Button buckle; 12. End plate; 121. Storage slot A; 1211. Positioning buckle; 122. Storage slot B; 123. Cup holder; 124. Cup tray; 125. Storage slot C; 126. Storage box; 127. Latch A; 13. Folding side plate; 131. Side plate A; 132. Side plate B; 133. Access window; 134. Latch B; 135. Handle slot; 136. Buckle plate; 14. Cover plate; 141. Cover plate frame; 15. Bottom plate; 151. Clamping block; 152. Reinforcing rib; 16. Pull rod component; 161. Pull rod storage cylinder; 162. Pull rod body; 163. Pull rod handle; 164. Latch C; 17. Support rod; 18. Caster; 19. Buckle; 2. Clamping slot.

DETAILED DESCRIPTION OF THE UTILITY MODEL

To understand of the characteristics and technical contents of the embodiments in the disclosure in more detail, the realization of the embodiment in the disclosure is described in detail in combination with the drawings. The drawings are for reference purposes only and are not used to limit the embodiments of the disclosure. In the following technical description, for ease of explanation, a number of details are provided to fully understand the disclosed embodiments. However, in the absence of these details, one or more embodiments may still be implemented. In other cases, familiar structures and devices may be shown simplistically to simplify the drawings.

The terms such as "first" and "second" in the specification and claims of the disclosure and in the drawings above are used to distinguish similar objects and are not necessarily used to describe a particular sequence or precedence order. Understandably, such data used are interchangeable where appropriate for the purposes of embodiments of the disclosure described herein. Furthermore, the terms "comprising" and "having" and any variations thereof are intended to cover non-exclusive inclusion.

In the embodiments of the disclosure, the orientation or position relations indicated by the terms such as "upper", "lower", "inner", "middle", "outer", "front" and "rear" are based on the orientation or position relations shown in the drawings. These terms are primarily intended to better describe the embodiments of the disclosure and their embodiments and are not intended to specify that the indicated device, element or component must have a particular orientation or be constructed and operated in a particular orientation. In addition, some of the above terms may be used to indicate other meanings in addition to orientation or position relations, for example, the term "upper" may also be used to indicate a dependency or connection relation in some cases. The ordinary technicians in the field may understand the specific meanings of these terms in the embodiments of the disclosure on a case-by-case basis.

In addition, the terms "arranged", "connected" and "fixed" should be understood in a broad sense. For example, "connected" can be fixedly connected, detachably connected or integrally constructed; it can be mechanically connected or electrically connected; it can be directly connected or indirectly connected through an intermediary, or connected between two devices, elements or components. The ordinary technicians in the field may understand the specific meanings of the above terms in the embodiments of the disclosure as the case may be.

Unless otherwise stated, the term "a plurality of" means two or more.

It should be noted that the embodiments in the disclosure and the features in the embodiments may be combined with each other without conflict.

As shown in FIG. 1 to FIG. 12, a foldable cart comprises a cart body 1, wherein the cart body 1 comprises a middle frame 11, end plates 12, a folding side plate 13, a cover plate 14 and a bottom plate 15, castors 18 are arranged at the bottoms of the middle frame 11 and the end plate 12, and the folding side plate 13 is connected to two sides of the middle frame 11 through the end plate 12, the cover plate 14 is arranged on the tops of the middle frame 11, the end plate 12 and the folding side plate 13, the bottom plate 15 is arranged at the bottoms of the middle frame 11, the end plate 12 and the folding side plate 13, a middle frame 11 carrier rod is removably connected to the top of the middle frame 11, and a metal strengthening rod 113 is arranged inside the middle frame 11 carrier rod.

Figure 1:
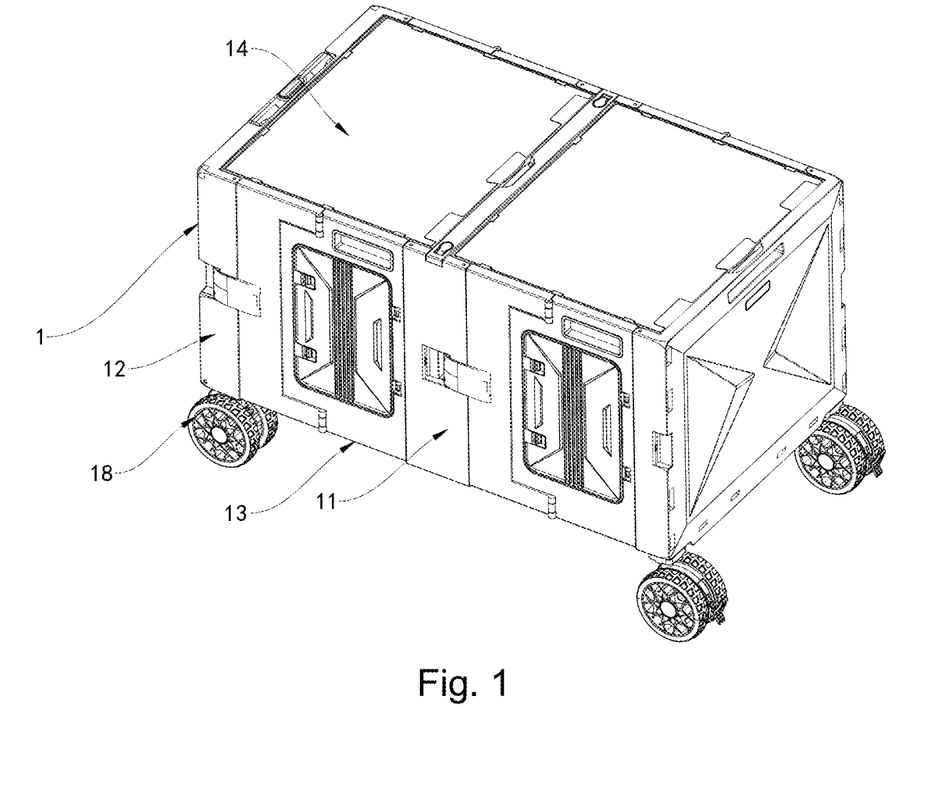
FIG. 1 is the structural diagram for a foldable cart proposed by the utility model.
Figure 2:
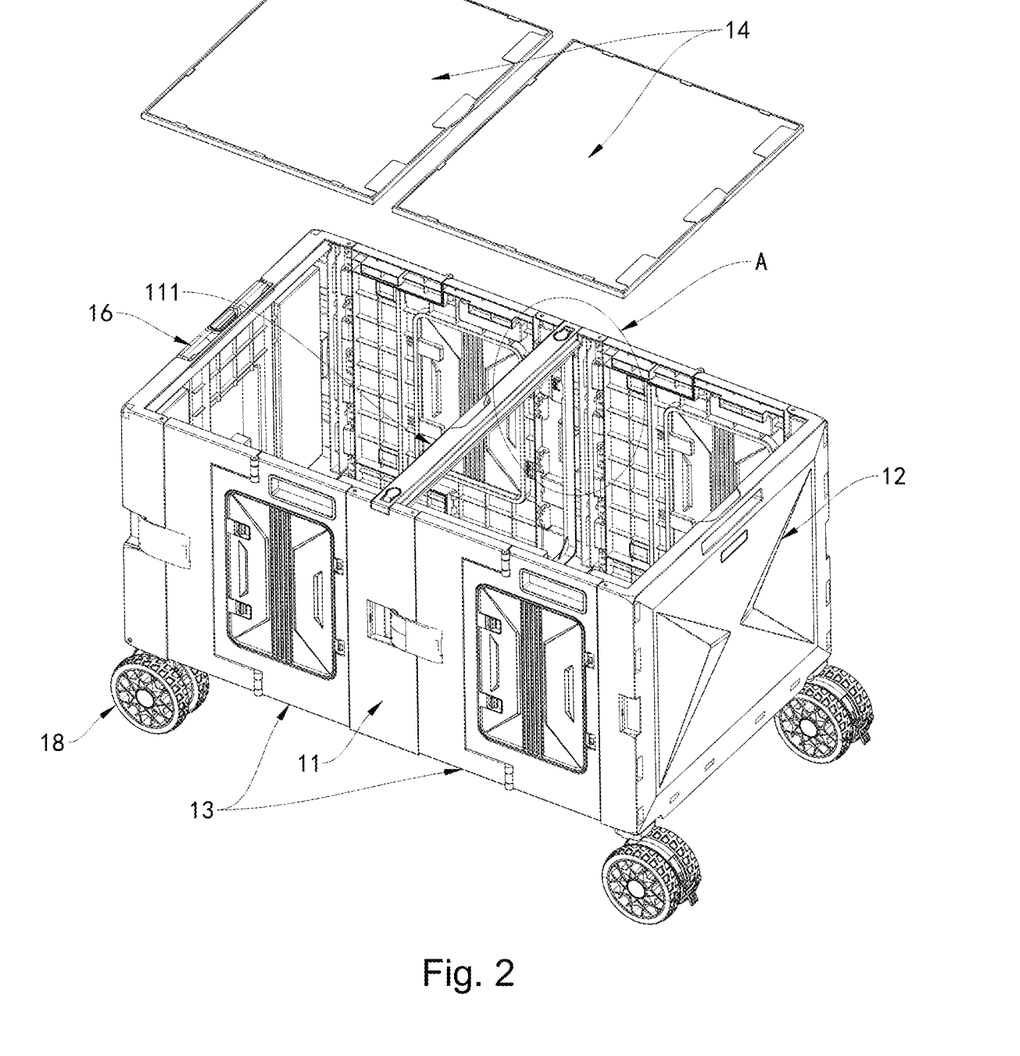
FIG. 2 is the schematic diagram of an internal structure for a cart body of a foldable cart proposed by the utility model.
Figure 3:
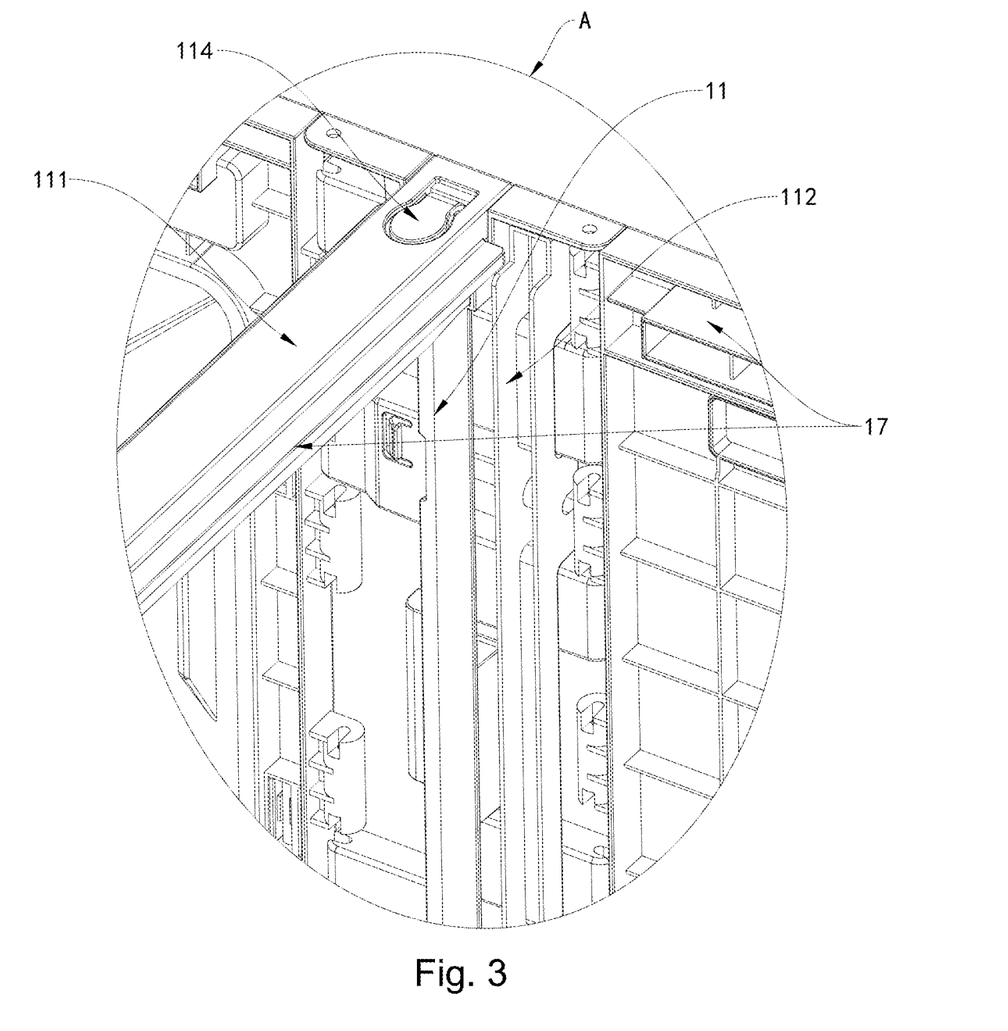
FIG. 3 is the enlarged structure view at A in FIG. 2.
Figure 11:
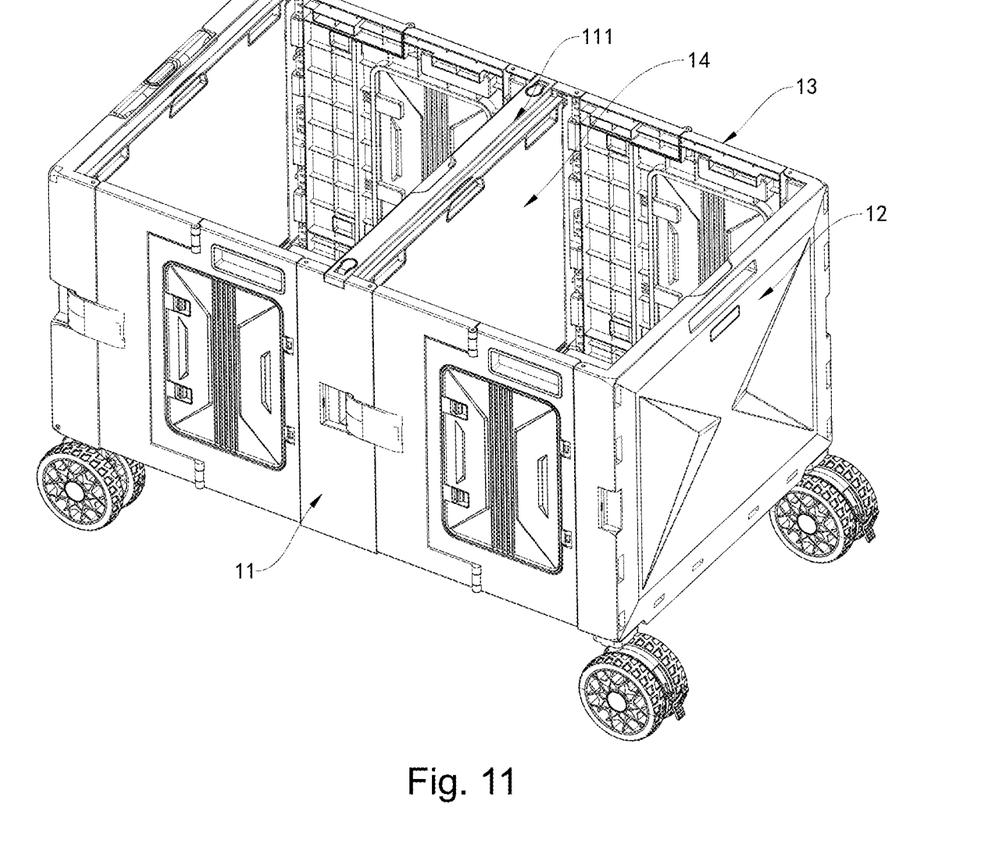
FIG. 11 is the schematic diagram for the cover plate storage state of a foldable cart proposed by the utility model.

Storage slots A 121 are arranged inside one of the end plates 12 and inside the middle frame 11 for storing the bottom plate 15 after being turned over, and at least two guide rails 112 respectively located on both sides of the middle frame 11 carrier rod are also arranged inside the middle frame 11 for storing the removed cover plate 14.

Figure 7:
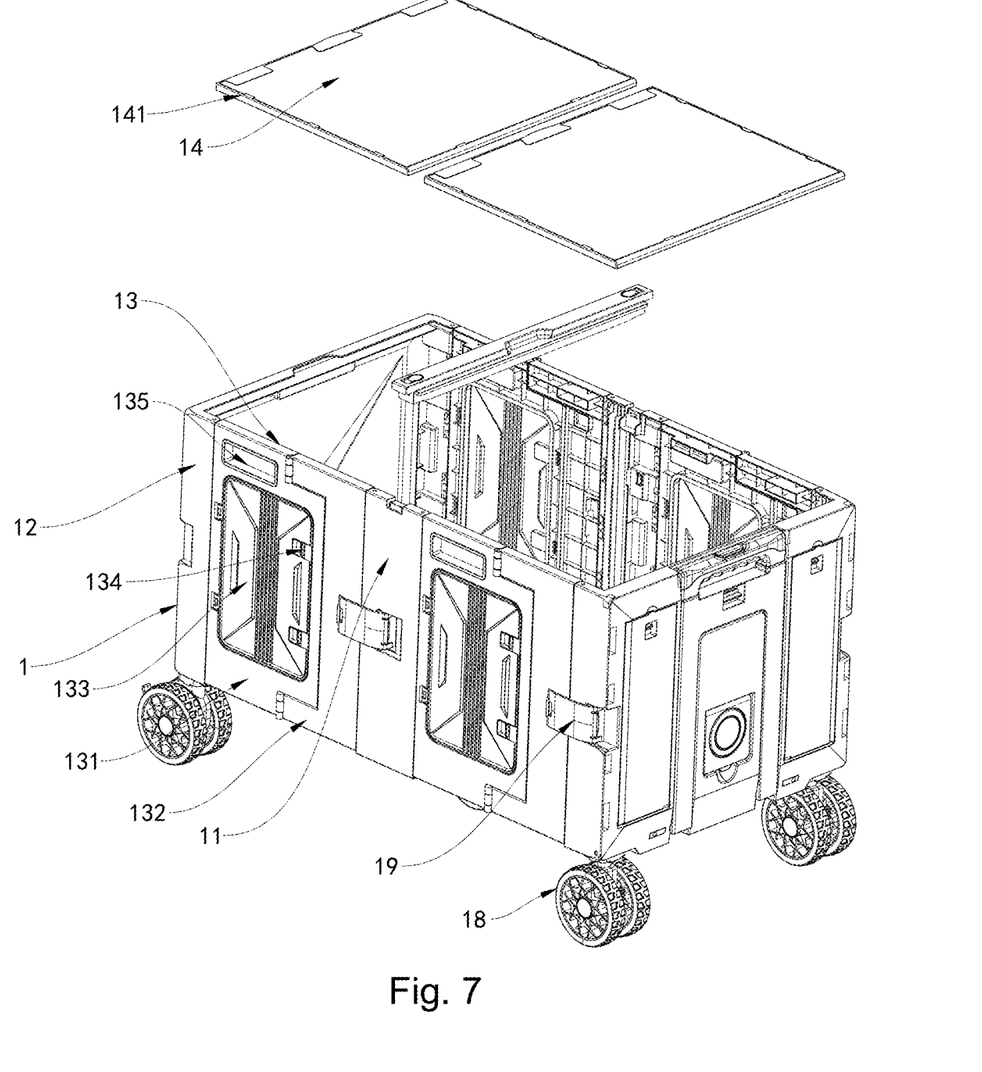
FIG. 7 is the structural diagram for a folding side plate of a foldable cart proposed by the utility model.

The folding side plate 13 comprises a side plate A 131 and a side plate B 132, and the opposite ends of the side plate A 131 and the side plate B 132 are hinged with each other, and the reverse ends of the side plate A 131 and the side plate B 132 are hinged with the end plate 12 and the middle frame 11 respectively.

Figure 4:
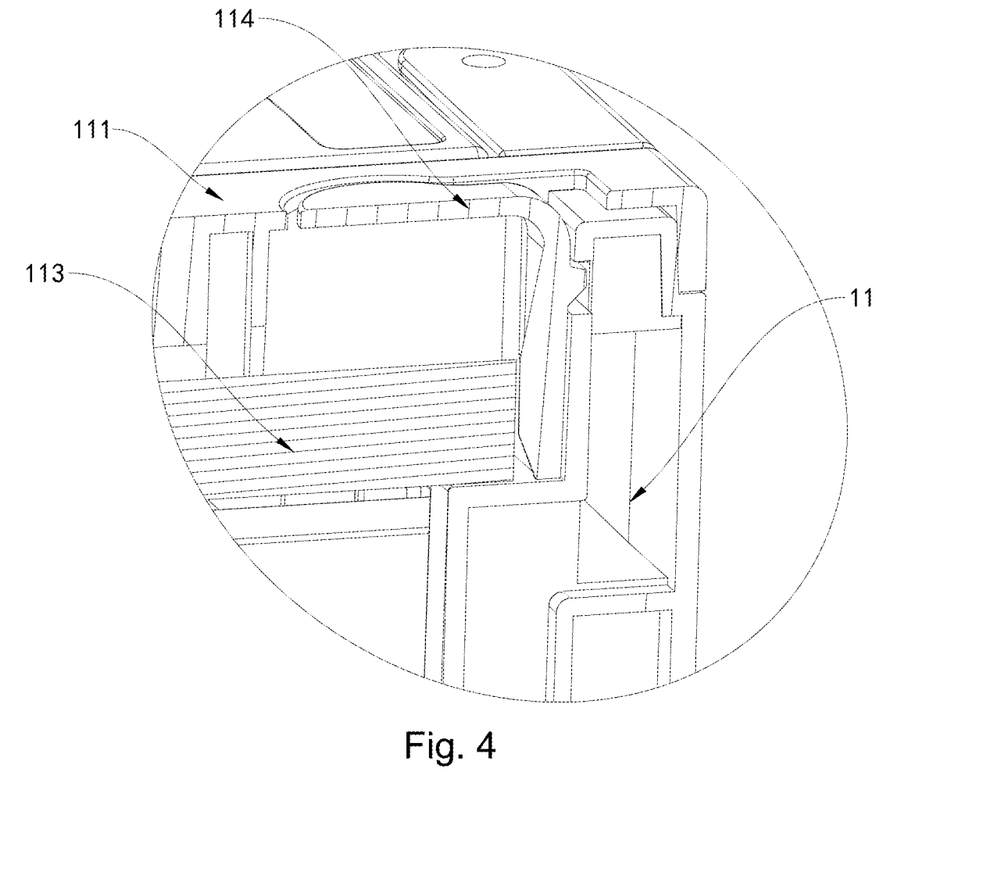
FIG. 4 is the structure profile for a button latch of a foldable cart proposed by the utility model.

As a specific technical proposal of the embodiment, button buckles 114 are arranged at both ends of the middle frame 11 carrier rod, the middle frame 11 carrier rod is movably clamped with the top of the middle frame 11 through the button buckles 114, and one end of the button buckle 114 extends to the top of the middle frame 11 carrier rod; the button buckle 114 is pressed to be disconnected with the middle frame 11, and then the middle frame 11 carrier rod can be removed, so that the internal space of the cart body 1 is not separated, and larger items can be placed; the metal strengthening rod 113 ensures the structural strength of the middle frame 11 carrier rod and supports the middle frame 11 more stably.

Figure 12:
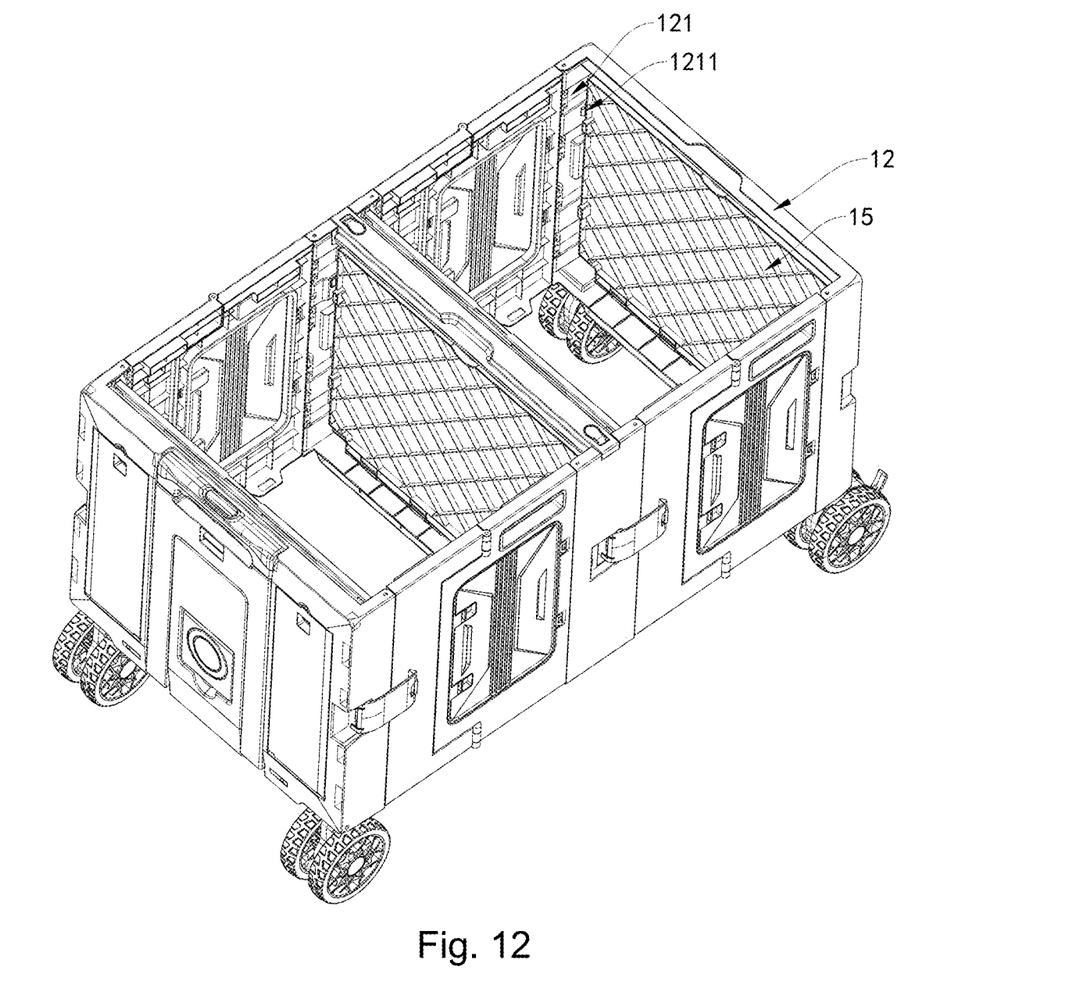
FIG. 12 is the structural diagram for the bottom plate storage state of a foldable cart proposed by the utility model.

As a specific technical proposal of the embodiment, a positioning buckle 1211 is arranged inside the storage slot A 121 for locking the bottom plate 15 after being turned over; after the bottom plate 15 is turned over to the inside of the storage slot 121, the positioning buckle 1211 locks the baffle plate turned over as shown in FIG. 12.

As a specific technical proposal of the embodiment, a cover plate 14 frame is arranged outside the cover plate 14, and support rods 17 for supporting the cover plate 14 are arranged on the side plate A 131, the side plate B 132, the middle frame 11 carrier rod and the end plate 12, and are used to support the cover plate 14.

As a specific technical proposal of the embodiment, a storage slot B 122 and a cup holder 123 located inside the storage slot B 122 are arranged on one side of one of the end plates 12, a cup tray 124 is movably arranged inside the cup holder 123, the cup holder 123 is hinged to one side of the end plate 12, and the cup can be placed by turning the cup holder 123.

Figure 9:
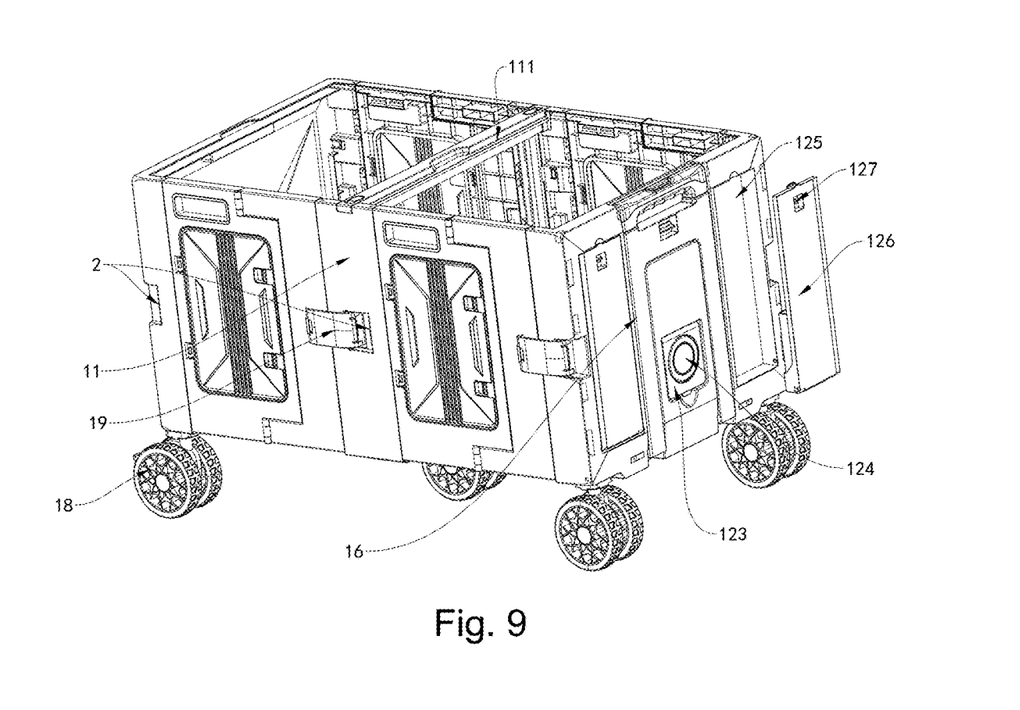
FIG. 9 is the structural diagram for a storage box of a foldable cart proposed by the utility model.

As a specific technical proposal of the embodiment, a storage slot C 125 located on both sides of the storage slot B 122 is arranged on one side of the end plate 12, a storage box 126 is movably arranged inside the storage slot C 125, and a latch A 127 inserted into the top of the inner wall of the storage slot C 125 is movably arranged at the top of the storage box 126; the latch A 127 is pulled to be divorced from the inside of the storage slot C 125 to unlock the storage box 126, the items can be placed after the storage box 126 is turned over, and then the storage box 126 can be reset and locked again through the latch A 127.

Figure 10:
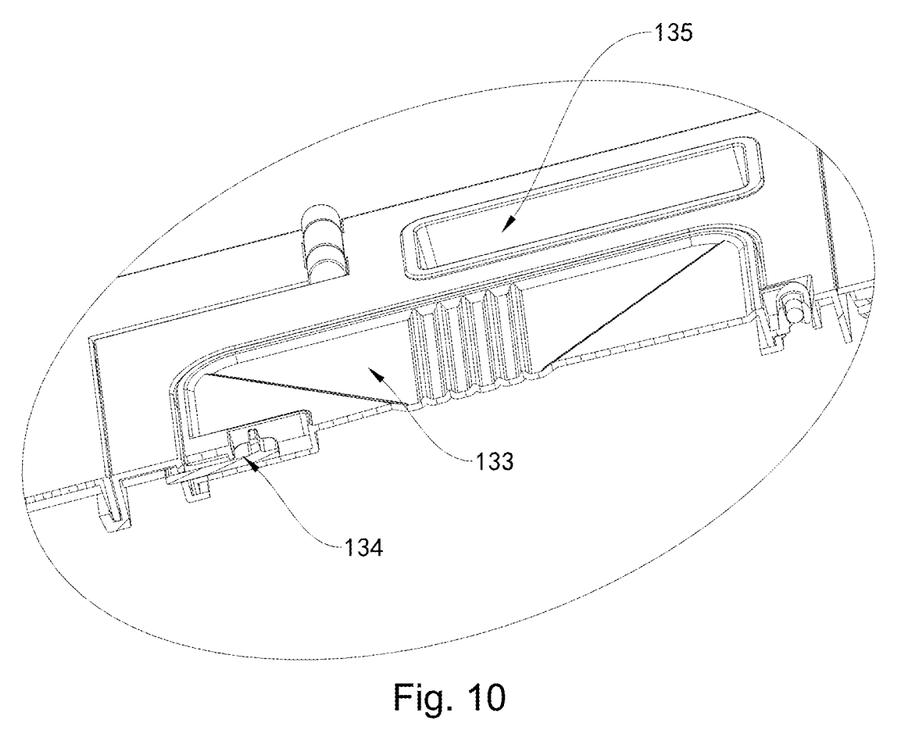
FIG. 10 is the structure profile for a latch B of a foldable cart proposed by the utility model.

As a specific technical proposal of the embodiment, an access window 133 is hinged inside the side plate A 131, a latch B 134 is arranged inside one end of the access window 133 away from the hinged end, one end of the latch B 134 is inserted into the side plate A 131, and a handle slot 135 is also arranged on one side of the side plate A 131; the access window 133 is arranged to facilitate the user to take the items inside the cart body 1 and is locked by the latch B 134, which is more convenient to use; the latch B 134, the latch C 164 and the latch A 127 are used in the same way.

Figure 8:
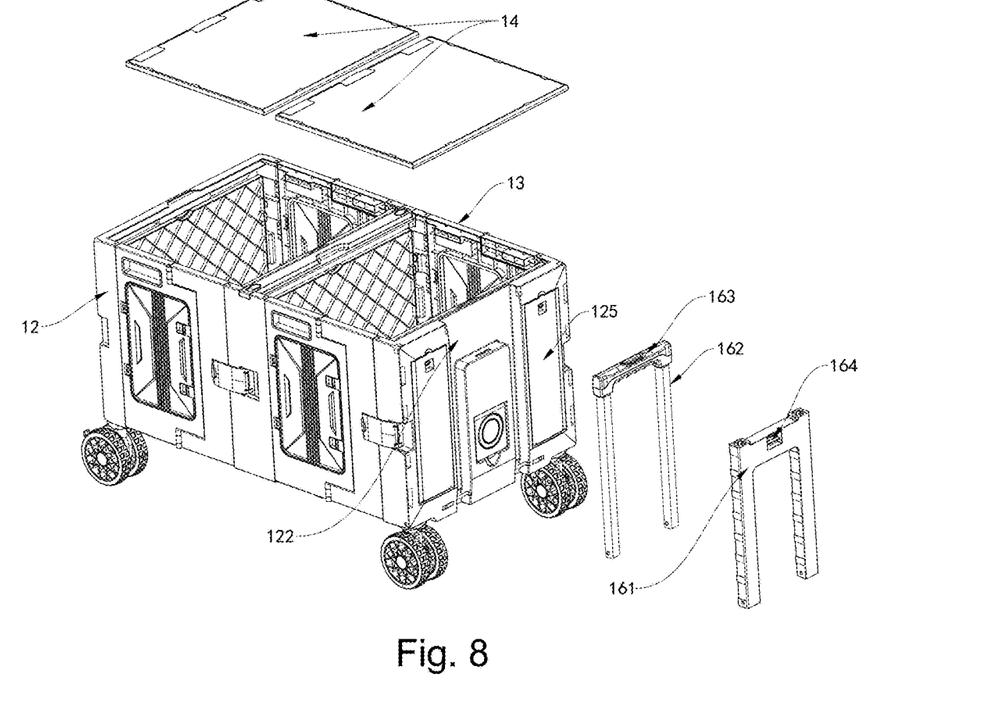
FIG. 8 is the structural explosive diagram for a pull rod component of a foldable cart proposed by the utility model.

As a specific technical proposal of the embodiment, a pull rod component 16 is arranged inside the storage slot B 122 and comprises a pull rod storage cylinder 161 with a bottom end hinged inside the storage slot B 122, a pull rod body 162 is movably arranged inside the pull rod storage cylinder 161, the top of the pull rod body 162 extends to the outside of the pull rod storage cylinder 161 and is provided with a pull rod handle, a latch C 164 is also arranged inside the pull rod storage cylinder 161, and one end of the latch C 164 is inserted into the inner wall of the storage slot B 122; the latch C 164 ensures the storage stability of the pull rod storage cylinder 161 in the storage slot B 122; pull out the latch C 164, turn over the pull rod storage cylinder 161 and pull out the pull rod body 162 through the pull rod handle 163, and then the cart body 1 is pulled to move through the pull rod component 16 without the latch C 164 pulled out.

As a specific technical proposal of the embodiment, buckles 19 are hinged on both sides of the middle frame 11 and both sides of one end plate 12, and clamping slots 2 are arranged on both sides of the other end plate 12 and both sides of the middle frame 11; when the hinged point between the side plate A 131 and the side plate B 132 is folded inward, the side plate A 131 and side plate B 132 are fitted together, and the end plate 12 is moved towards the middle frame 11; when the end plate 12 is connected with the middle frame 11, the buckle 19 is clamped with the clamping slot 2, so that the cart body 1 can maintain a stable folding state.

Figure 5:
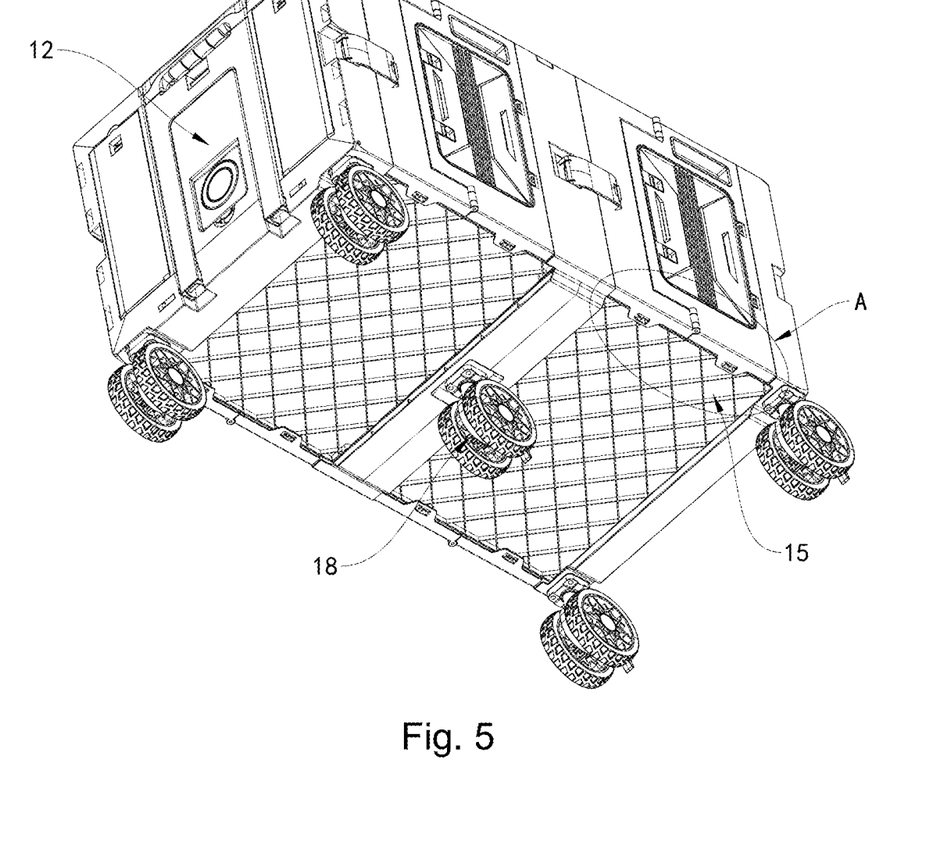
FIG. 5 is a schematic diagram of a bottom structure for a cart body of a foldable cart proposed by the utility model.
Figure 6:
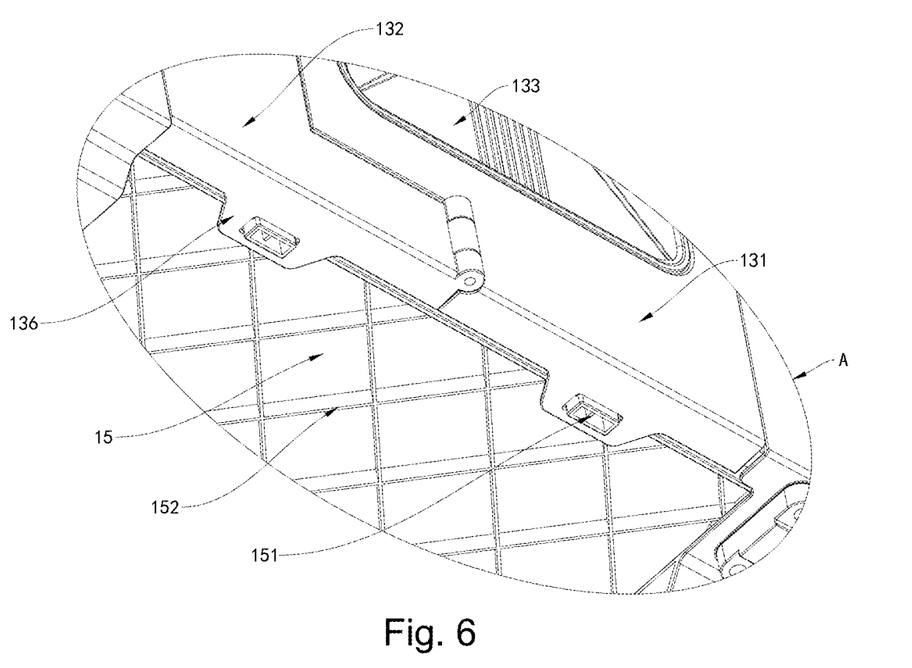
FIG. 6 is the enlarged structure view at A in FIG. 5.

As a specific technical proposal of the embodiment, a plurality of crisscrossed reinforcing ribs 152 are arranged at the bottom of the bottom plate 15 and on one side of the side plate A 131 and the side plate B 132, buckle plates 136 with one end extending to the bottom of the side plate A 131 are arranged at the bottoms of the side plate A 131 and the side plate B 132, and a clamping block 151 with one end inserted into the buckle plate 136 is arranged at the bottom of the bottom plate 15; the buckle plate 136 supports the bottom plate 15 to ensure the stability of the bottom plate 15, and the bottom plate 15 blocks the folding side plates 13 on both sides, so that the folding side plate 13 can maintain a stable expansion state; when the bottom plate 15 is turned over and enters the inside of the storage slot 121, the positioning clip 1211 in the storage slot 121 can directly lock the bottom plate 15, so that the bottom plate 15 maintains a stable storage state after being turned over.

To sum up, the folding side plate 13 of the foldable cart greatly reduces the occupied space after the whole folding of the cart body 1; the buckle 19 and the clamping slot 2 ensures the stability of the cart body 1 in the folding state; the bottom plate 15 is locked by the positioning buckle 1211 after being turned over, which is conducive to the subsequent folding operation; the middle frame 11 carrier rod is removably installed at the top of the middle frame 11 through the button buckle 114; after the middle frame 11 carrier rod is removed, the internal space of the cart body 1 is not separated, and larger items can be placed; the metal strengthening rod 113 ensures the structural strength of the middle frame 11 carrier rod, supports the middle frame 11 more stably, and ensures the overall structural strength of the cart body 1.

The embodiments of the disclosure are shown sufficiently in the above descriptions and the drawings to enable the technicians in the field to practice them. Other embodiments may include structural changes as well as other changes. Embodiments represent possible changes only. Individual parts and functions are optional unless explicitly required, and the operation sequence can vary. Parts and features of some embodiments may be included in or substituted for parts and features of other embodiments. The embodiments of the disclosure are not limited to the structures described above and shown in the drawings, and may be subject to various modifications and changes within their scope. The scope of the disclosure is limited only by the attached claims.

The invention claimed is:

1. A foldable cart, comprising a cart body (1), and characterized in that the cart body (1) comprises a middle frame (11), end plates (12), a folding side plate (13), a cover plate (14) and a bottom plate (15), castors (18) are arranged at the bottoms of the middle frame (11) and the end plate (12), and the folding side plate (13) is connected to two sides of the middle frame (11) through the end plate (12), the cover plate (14) is arranged on the tops of the middle frame (11), the end plate (12) and the folding side plate (13), the bottom plate (15) is arranged at the bottoms of the middle frame (11), the end plate (12) and the folding side plate (13), a middle frame carrier rod (11) is removably connected to the top of the middle frame (11), and a metal strengthening rod (113) is arranged inside the middle frame carrier rod (11);

storage slots A (121) are arranged inside one of the end plates (12) and inside the middle frame (11) for storing the bottom plate (15) after being turned over, and at least two guide rails (112) respectively located on both sides of the middle frame carrier rod (11) are also arranged inside the middle frame (11) for storing the removed cover plate (14);

the folding side plate (13) comprises a side plate A (131) and a side plate B (132), and the opposite ends of the side plate A (131) and the side plate B (132) are hinged with each other, and the reverse ends of the side plate A (131) and the side plate B (132) are hinged with the end plate (12) and the middle frame (11) respectively.

2. The foldable cart according to claim 1, characterized in that button buckles (114) are arranged at both ends of the middle frame carrier rod (11), the middle frame carrier rod (11) is movably clamped with the top of the middle frame (11) through the button buckles (114), and one end of the button buckle (114) extends to the top of the middle frame carrier rod (11).

3. The foldable cart according to claim 1, characterized in that a positioning buckle (1211) is arranged inside the storage slot A (121) for seizing the bottom plate (15) after being turned over.

4. The foldable cart according to claim 1, characterized in that a cover plate (14) frame is arranged outside the cover plate (14), and support rods (17) for supporting the cover plate (14) are arranged on the side plate A (131), the side plate B (132), the middle frame carrier rod (11) and the end plate (12).

5. The foldable cart according to claim 1, characterized in that a storage slot B (122) and a cup holder (123) located inside the storage slot B (122) are arranged on one side of one of the end plates (12), and a cup tray (124) is movably arranged inside the cup holder (123).

6. The foldable cart according to claim 1, characterized in that an access window (133) is hinged inside the side plate A (131), a latch B (134) is arranged inside one end of the access window (133) away from the hinged end, one end of the latch B (134) is inserted into the side plate A (131), and a handle slot (135) is also arranged on one side of the side plate A (131).

7. The foldable cart according to claim 1, characterized in that buckles (19) are hinged on both sides of the middle frame (11) and both sides of one end plate (12), and clamping slots (2) are arranged on both sides of the other end plate (12) and both sides of the middle frame (11).

8. The foldable cart according to claim 1, characterized in that a plurality of crisscrossed reinforcing ribs (152) are arranged at the bottom of the bottom plate (15) and on one side of the side plate A (131) and the side plate B (132), buckle plates (136) with one end extending to the bottom of the side plate A (131) are arranged at the bottoms of the side plate A (131) and the side plate B (132), and a clamping block (151) with one end inserted into the buckle plate (136) is arranged at the bottom of the bottom plate (15).

\* \* \* \* \*